(12) United States Patent
Poklop et al.

(10) Patent No.: US 8,540,876 B2
(45) Date of Patent: *Sep. 24, 2013

(54) PERMEATE ADAPTER FOR MULTI-TUBE PRESSURE VESSEL

(75) Inventors: Steven M. Poklop, Palatine, IL (US); Christopher Naunheimer, Arlington Heights, IL (US); Mark E. Schott, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 1287 days.

This patent is subject to a terminal disclaimer.

(21) Appl. No.: 11/906,262

(22) Filed: Oct. 1, 2007

(65) Prior Publication Data

US 2009/0084725 A1     Apr. 2, 2009

(51) Int. Cl.
*B01D 63/06* (2006.01)
*B01D 69/04* (2006.01)
*B01D 25/00* (2006.01)

(52) U.S. Cl.
USPC ............... 210/321.8; 210/321.89; 210/323.2; 210/439

(58) Field of Classification Search
USPC ........... 210/321.83, 330, 232, 257.2, 321.86, 210/321.84, 652, 321.81, 323.2, 345, 455, 210/456, 457, 458, 459, 462, 463, 447, 439, 210/321.72, 321.75, 321.77, 321.78, 321.79, 210/321.8, 321.87, 321.88, 321.89, 321.9, 210/323.1

See application file for complete search history.

(56) References Cited

U.S. PATENT DOCUMENTS

| | | | | |
|---|---|---|---|---|
| 3,774,771 A * | 11/1973 | Manjikian et al. | ........ | 210/321.87 |
| 4,083,780 A * | 4/1978 | Call | ............... | 210/652 |
| 4,517,085 A * | 5/1985 | Driscoll et al. | ............... | 210/232 |
| 4,652,373 A * | 3/1987 | Trimmer | ................. | 210/321.87 |
| 4,746,430 A | 5/1988 | Cooley | ................... | 210/321.85 |
| 4,808,199 A | 2/1989 | Yearout | ............... | 55/16 |
| 4,874,405 A | 10/1989 | Minhas | ........................ | 55/158 |
| 5,108,604 A * | 4/1992 | Robbins | ................... | 210/321.74 |
| 5,221,473 A * | 6/1993 | Burrows | ........................ | 210/232 |
| 5,851,267 A | 12/1998 | Schwartz | ........................ | 96/7 |
| 6,007,723 A | 12/1999 | Ikada et al. | | |
| 6,136,073 A | 10/2000 | Coan et al. | ........................ | 96/8 |
| 6,153,097 A | 11/2000 | Jensvold et al. | ......... | 210/321.81 |
| 6,224,767 B1 | 5/2001 | Fujiwara et al. | ........... | 210/323.1 |
| 6,495,037 B1 * | 12/2002 | Schuyler | ........................ | 210/232 |
| 6,814,780 B2 | 11/2004 | Bikson et al. | ........................ | 95/51 |
| 7,169,213 B2 | 1/2007 | Liu et al. | | |
| 7,338,601 B2 | 3/2008 | Schott et al. | ............. | 210/321.74 |
| 2006/0124529 A1 * | 6/2006 | Schott et al. | ............... | 210/321.6 |
| 2008/0149555 A1 | 6/2008 | Schwartz et al. | ......... | 210/321.81 |

FOREIGN PATENT DOCUMENTS

EP      1 598 105 A1     11/2005

* cited by examiner

*Primary Examiner* — David C Mellon
(74) *Attorney, Agent, or Firm* — Mark Goldberg

(57) ABSTRACT

A permeate adapter is provided. The permeate adapter may be used within a pressure vessel. The permeate adapter includes a front portion and an oppositely disposed back portion. The front portion includes a permeate opening for receiving an end of a permeate passage tube of a membrane cartridge and for being in fluid communication with a permeate reservoir. The front portion and the back portion each include one or more fluid openings. Fluid passageways are connected between the one or more front portion fluid openings and the back portion fluid openings. The fluid passageways receive an end of a membrane cartridge at the front portion. At the back portion, the fluid passageways are in fluid communication with a fluid reservoir adjacent the back portion of the permeate adapter.

11 Claims, 8 Drawing Sheets

PERMEATE ADAPTER FOR MULTI-TUBE PRESSURE VESSEL

FIELD

This technical disclosure relates generally to fluid separation and, more particularly, to fluid separation via multiple membrane cartridges or modules disposed within a pressure vessel.

BACKGROUND

A variety of commercial processes rely on the use of fluid separation techniques to separate one or more desirable fluid components from a mixture. In particular, various such processes may involve the separation of liquid mixtures, the separation of vapors or gases from liquids, or the separation of intermingled gases.

The use of membranes for fluid separations has achieved increased popularity over other known separation techniques. Membranes, once produced into elements, are typically formed into modules or cartridges, e.g., a tube containing a plurality of membrane separation elements. Modules can be used singly or, more commonly, interconnected in series or parallel arrangements or arrays in the form of membrane skids.

One of the difficulties in building membrane skids is the need to ensure that the permeate header lines up with the flange connections at the end of the membrane pressure tube. Increasing the number of modules in an installation increases the number of flange connections that must properly aligned with a permeate header thereby increasing the difficulty of interconnecting individual modules.

In addition, a common problem associated with the use of spiral wound membranes is that each module containing the membranes is typically required to be machined to a close tolerance to assure good pressure seals. As a result, the cost for each module can be significantly increased.

Further, each of the membrane modules loaded on an individual skid requires some physical separation to accommodate installation of the individual membrane modules. Typically, membrane separation installations are constructed using a number of membrane separation modules which are stacked vertically to form a skid and create the required membrane area to process a fluid. This design requires a multitude of external connections to feed each individual membrane module and remove the processed fluid. As a result, packing of such large systems may present a problem because of the need to accommodate the input, output and permeate ports of each module.

Such individual skids are constructed using structural steel to support each set of membrane modules. Such structural steel supports, however, add weight to the overall membrane system and increase the area required to install each individual skid. Consequently, such larger systems are heavier and more expensive to manufacture due to the quantity of materials needed to produce the structural steel supports, as well as, individual tubes for each module. Such larger systems are also more complex due to the increased number of connections between the membrane modules and common headers used to deliver and remove fluids from the skid.

Thus, there is a need and a demand for separation systems which incorporate an increased number of membrane cartridges or modules in a given area. In particular, there is a need and a demand for separation systems which incorporate multiple membrane cartridges into a single pressure vessel.

There is also a need and a demand for separation systems having simplified process fluid stream connections. Further, for example, there is a need and a demand for separation systems that permit feed stream delivery to, residual stream removal from, and permeate stream removal from a multitude of membrane cartridges at a reduced number of locations.

There is a further need and a demand for separation systems that are less expensive to produce.

SUMMARY

We therefore provide a permeate adapter for use within a pressure vessel. The permeate adapter includes a front portion with a permeate opening for receiving an end of a permeate passage tube of a membrane cartridge and for being in fluid communication with a permeate reservoir. The front portion additionally includes one or more fluid openings. A back portion is disposed opposite the front portion and also includes one or more fluid openings. Fluid passageways are connected between the front portion fluid openings and the back portion fluid openings. At the front portion of the permeate adapter, the fluid passageways receive an end of a membrane cartridge. At the back portion, the fluid passageways are in fluid communication with a fluid reservoir adjacent the back portion of the permeate adapter.

A separation system includes an elongated pressure vessel with a feed stream inlet, a residual stream outlet, and at least one permeate stream outlet. A first tube sheet assembly is disposed within the pressure vessel and defines a first permeate reservoir. The first tube sheet assembly includes a first pair of tube sheets and one or more first sleeves disposed therebetween. The first permeate reservoir is in fluid communication with the at least one permeate stream outlet. The separation system further includes a first fluid reservoir disposed within the pressure vessel between a first end of the pressure vessel and the first tube sheet assembly. A plurality of membrane cartridge assemblies is disposed within the pressure vessel and extends between the first end and a second end of the pressure vessel. At least one membrane cartridge assembly includes a first permeate adapter and a membrane cartridge, where the first permeate adapter is joined to a first end of the membrane cartridge and disposed within one of the first sleeves. The first permeate adapter includes a front portion having at least one fluid opening and a permeate opening that receives an end of a permeate passage tube of a membrane cartridge at the front portion and that is in fluid communication with a permeate reservoir. The first permeate adapter further includes a back portion with at least one fluid opening, and at least one fluid passageway connected between the front portion fluid opening and the back portion fluid opening. The fluid passageway receives an end of a membrane cartridge at the front portion and is in fluid communication with a fluid reservoir adjacent the back portion.

A pressure vessel is provided that comprises an elongated housing containing a first fluid reservoir adjacent a first end of the housing, a second fluid reservoir adjacent a second end of the housing, a first permeate reservoir adjacent the first fluid reservoir defined by a first tube sheet assembly, a second permeate reservoir adjacent the second fluid reservoir defined by a second tube sheet assembly, and a cartridge chamber disposed between the first and second permeate reservoirs, the first tube sheet assembly including a first tube sheet, a second tube sheet and a plurality of first sleeves disposed therebetween, the second tube sheet assembly including a third tube sheet, a fourth tube sheet and a plurality of second sleeves disposed therebetween, the plurality of second sleeves corresponding to the plurality of first sleeves. The pressure vessel further includes a feed stream inlet, a residual stream outlet, at least one first permeate stream outlet in fluid communication with the first permeate reservoir, and at least one second permeate stream outlet in fluid communication with the second permeate reservoir. A plurality of membrane cartridge assemblies is disposed within the elongated housing and extends between the first fluid reservoir and the second fluid reservoir. Each membrane cartridge assembly includes a first permeate adapter, a membrane cartridge, and a second permeate adapter. The first permeate adapter is joined to a first end of the membrane cartridge and disposed within one of the first sleeves, the first permeate adapter is in fluid communication with the first fluid reservoir, the first end of the membrane cartridge and the first permeate reservoir. The membrane cartridge is disposed within a membrane pressure tube. The second permeate adapter is joined to a second end of the membrane cartridge and disposed within the corresponding second sleeve. The second permeate adapter is in fluid communication with the second fluid reservoir, the second end of the membrane cartridge and the second permeate reservoir. The first permeate adapter and the second permeate adapter each comprise a front portion having at least one fluid opening and a permeate opening that receives an end of a permeate passage tube of a membrane cartridge at the front portion and that is in fluid communication with the first and/or second permeate reservoir. The adapters further include a back portion having at least one fluid opening and at least one fluid passageway connected between the front portion fluid opening and the back portion fluid opening. The fluid passageway receives an end of a membrane cartridge at the front portion and is in fluid communication with the first and/or second fluid reservoir adjacent the back portion.

DETAILED DESCRIPTION

We provide a separation system for use in separation of a fluid feed via a plurality of membrane cartridges or modules disposed within a pressure vessel. As described in greater detail below, the separation systems have improved packing and reduced space requirements. Moreover, we provide separation systems that are lighter and less expensive to manufacture. Further, separation systems having simplified and/or a reduced number of process stream connections are provided.

Figure 1:
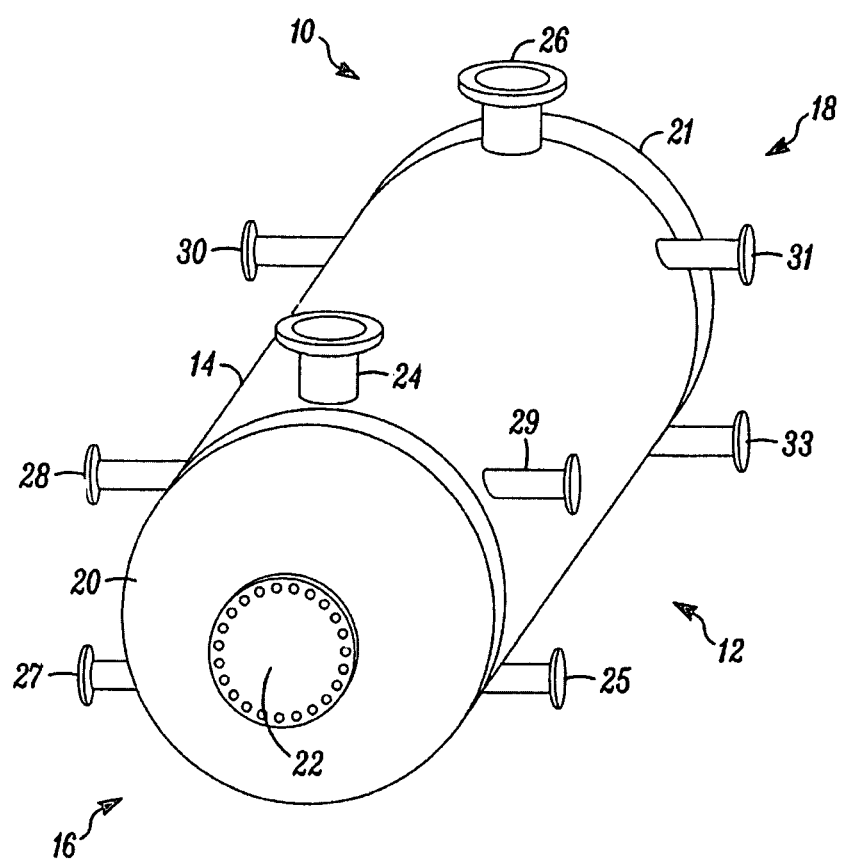
FIG. 1 is a perspective view of a separation system in accordance with one embodiment.

The representative structures may be practiced or embodied by, in or with separation systems having a variety of different specific structures. As representative, FIG. 1 illustrates a separation system, generally designated by the reference numeral 10, in accordance with one representative structure. While separation systems have various uses, the structures are believed to have particular utility for use in or with the separation of one or more gases from a mixture of gases. It is to be understood, however, that the broader practice of the embodiments are not necessarily limited to use for the separation of gases from a mixture of gases. Other fluid separations such as, for example, liquid separations by reverse osmosis processing can, if desired, also be practiced employing separation systems in accordance with the embodiments.

Returning to FIG. 1, the separation system 10 includes a pressure vessel 12. The pressure vessel 12 is suitably in the form of an elongated housing having a generally cylindrical or tubular cylindrical center section 14. The center section 14 of the pressure vessel 12 may generally be constructed to have any size suitable to house a desired plurality of membrane cartridge assemblies. The inner diameter of pressure vessels may be adjusted to accommodate various operation and process conditions to achieve a desired flow per membrane cartridge assembly and to meet the required product specification.

The center section 14 of the pressure vessel 12 may have an inner diameter of about 0.6 m (2 ft.) to about 6.1 m (20 ft.). In accordance with another embodiment the center section 14 of the pressure vessel 12 may have an inner diameter of about 1.8 m (6 ft.) to about 6.1 m (20 ft.). The center section 14 of the pressure vessel 12 may have an inner diameter of about 1.8 m (6 ft.) to about 4.3 (14 ft.).

Each of a first end 16 and/or a second end 18 of the pressure vessel 12 may be terminated with a hemispherical or semi-hemispherical head 20 and 21, respectively. The head 20 and/or the head 21 may include a manway, 22 and 23 (shown in FIG. 2), respectively, to provide access to the interior of the pressure vessel 12. Alternatively, one of the first or second ends, 16 and 18, respectively, may be closed to the atmosphere such as by way of a blind flange (not shown) which forms a solid end cover at one of the first or second ends, 16 and 18, respectively, of the pressure vessel 12.

The pressure vessels may be constructed from various suitable materials, such as various metals or metal alloys, desirably at least relatively inert to the fluid stream materials passing therethrough. For example, stainless steel in the form of a plate having a thickness of about 5 cm to about 15.25 cm (about 2 to about 6 inches) may be rolled or otherwise used to form the pressure vessel 12 in accordance with one embodiment. Alternatively, pressure vessels can be constructed of other metallic materials such as, for example, aluminum, carbon steel and/or stainless steel. In accordance with certain embodiments, the pressure vessel 12 can withstand pressures up to about 15.2 MPa (about 2200 psi).

The pressure vessel 12 includes a feed stream inlet or port 24 adjacent or near the pressure vessel first end 16 and a residual stream outlet or port 26 adjacent the pressure vessel second end 18. FIG. 1 depicts both the feed stream inlet 24 and the residual stream outlet 26 oriented vertically. However, the feed stream inlet 24 and/or the residual stream outlet 26 may be appropriately disposed anywhere about the circumference of the pressure vessel 12 adjacent the respective desired pressure vessel first end 16 and/or the pressure vessel second end 18.

Both the feed stream inlet 24 and the residual stream outlet 26 may be adjacent the pressure vessel first end 16 or the second pressure vessel end 18. In a further embodiment, the pressure vessel 12 may include multiple feed stream inlets and/or residual stream outlets located about the circumference of the pressure vessel adjacent the pressure vessel first end 16 and/or the pressure vessel second end 18.

The pressure vessel 12 further includes at least one first permeate stream outlet or port 28 adjacent or near the pressure vessel first end 16. For example, referring to FIG. 1, the pressure vessel 12 includes four first permeate stream outlets, 25, 27, 28 and 29, respectively. Additionally or alternatively, the pressure vessel 12 may include at least one second permeate stream outlet or port 30 adjacent or near the pressure vessel second end 18. For example, the pressure vessel 12 illustrated in FIG. 1 also includes four second permeate stream outlets, three of which are visible, 30, 31 and 33, respectively. The second permeate stream outlets are arranged in a manner similar to the first permeate stream outlets, 25, 27, 28 and 29, respectively. The number of first and/or second permeate stream outlets, 28 and 30, respectively, may vary depending upon the particular application and/or process specification.

The first and/or second permeate stream outlets, 28 and 30, respectively, can desirably be disposed at appropriate select locations about the circumference of the pressure vessel 12 and radially extending therefrom, such as shown in FIG. 1. In particular, FIG. 1 shows the first permeate stream outlets 28 and the second permeate stream outlets 30 as extending from the pressure vessel 12 perpendicular to the feed stream inlet 24 and the residual stream outlet 26.

Figure 2:
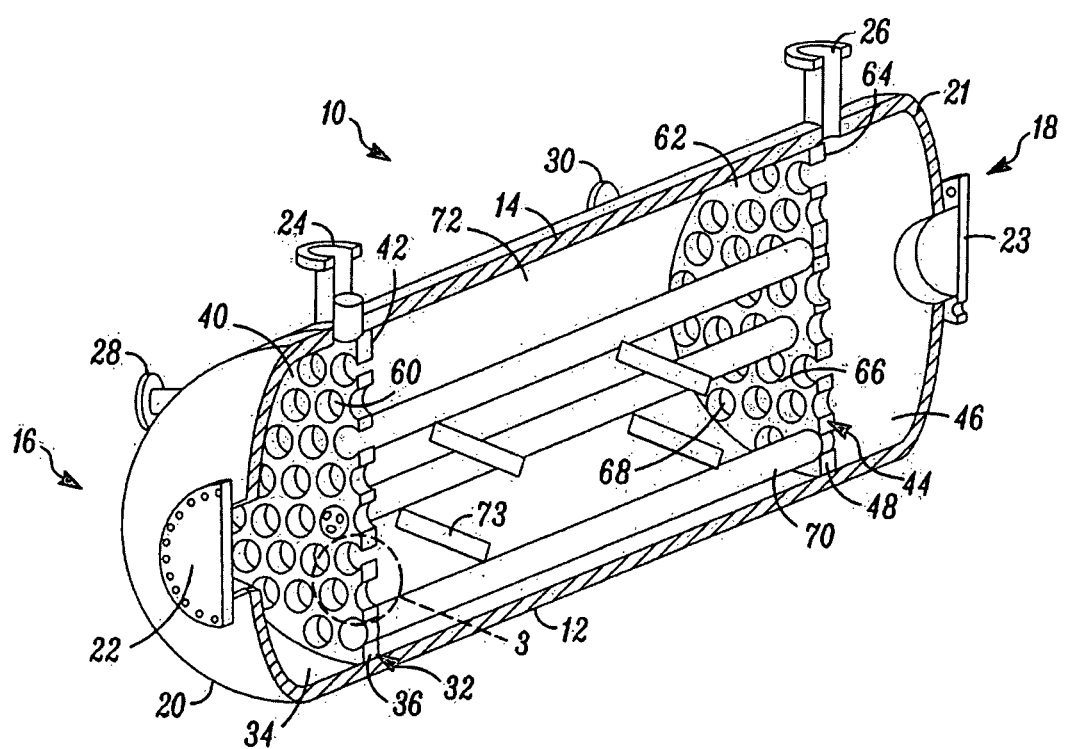
FIG. 2 is a cross-sectional side view of the separation system shown in FIG. 1.

Turning to FIG. 2, the separation system 10 further includes a first tube sheet assembly 32 disposed within the pressure vessel 12 adjacent the pressure vessel first end 16. The first tube sheet assembly defines a first fluid reservoir 34 disposed between the pressure vessel first end 16 and the first tube sheet assembly 32 and a first permeate reservoir 36. The first fluid reservoir 34 is in fluid communication with the feed stream inlet port 24 and the first permeate reservoir 36 is in fluid communication with at least one permeate stream outlet 28.

The first fluid reservoir 34 may be a feed reservoir and the second fluid reservoir 46 may be a residual reservoir. Alternatively, the first fluid reservoir 34 may be a residual reservoir and the second fluid reservoir 46 may be a feed reservoir.

Figure 3:
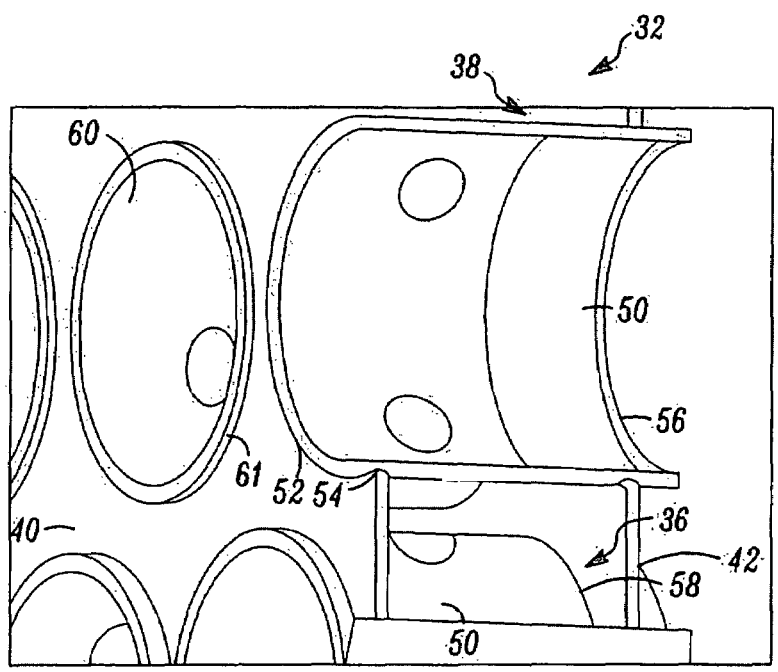
FIG. 3 is a detail view of section 3 shown in FIG. 2.

As shown in detail in FIG. 3, the first tube sheet assembly 32 includes a first pair of tube sheets 38, which includes a first tube sheet 40 and a second tube sheet 42, which define the first permeate reservoir 36 therebetween. The first tube sheet assembly 32 further includes a plurality of first sleeves 50 disposed between the first tube sheet 40 and the second tube sheet 42. The first tube sheet 40 has a plurality of first openings 54 formed therethrough and the second tube sheet 42 has a plurality of corresponding second openings 58 formed therethrough.

Each first sleeve 50 has a first end 52 disposed within and extending through one of the first openings 54 in the first tube sheet 40 and a second end 56 disposed within and extending through the corresponding second opening 58 in the second tube sheet 42 forming a plurality of first channels 60 which extend through the first tube sheet assembly 32.

Figure 4:
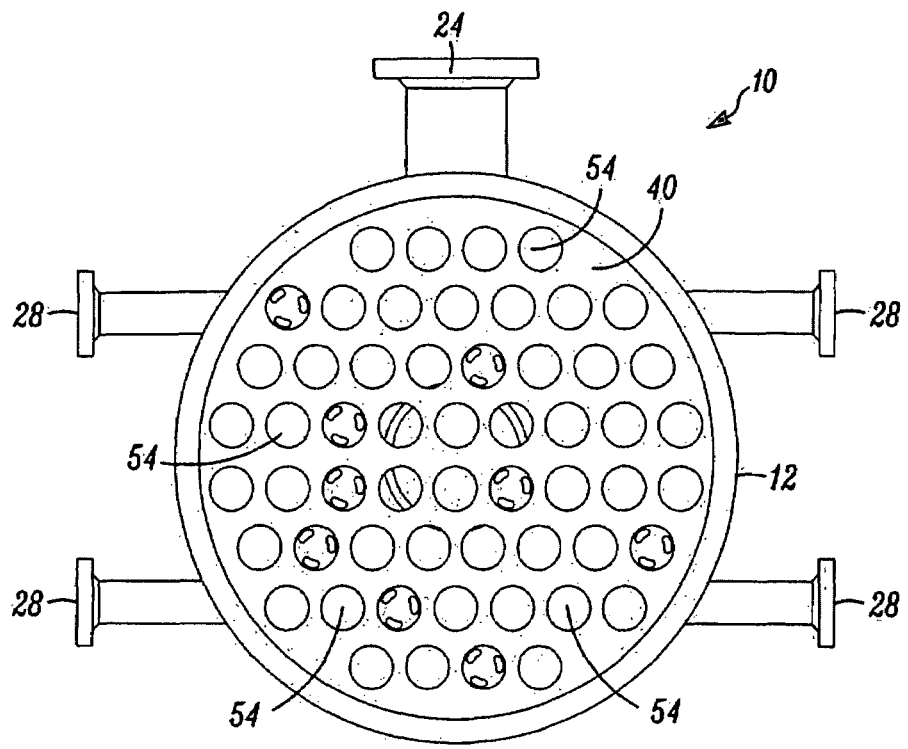
FIG. 4 is a cross-sectional end view of the separation system shown in FIG. 1.

The first openings 54 and the corresponding second openings 58 may be arranged in any suitable pattern, array or arrangement. For example, as illustrated in FIG. 4, the first openings 54 in tube sheet 40 may be formed in a honeycomb-like pattern. Accordingly, the second tube sheet 42 would have a corresponding honeycomb-like pattern of the second openings 58 (not shown). The first and second openings 54 and 58, respectively, can be laid out such that the first sleeves 50 are arranged in a manner similar to that of a heat exchanger.

The first and second tube sheets, 40 and 42, respectively, are held in place and at a proper or desired distance from each other by the first sleeves 50, as illustrated in FIG. 3. For example, the first sleeves 50 may be configured to maintain a distance between the first tube sheet 40 and the second tube sheet 42 of about 10.2 cm (about 4 inches) to about 91.4 cm (about 36 inches.). Also, the first sleeves 50 may be configured to maintain a distance between the first tube sheet 40 and the second tube sheet 42 of about 15.2 cm (about 6 inches) to about 45.7 cm (about 18 inches). Further, the first sleeves 50 may be configured to maintain a distance between the first tube sheet 40 and the second tube sheet 42 of about 17.8 cm (about 7 inches).

Suitably, as shown in FIG. 3, the first sleeves 50 are welded or otherwise permanently joined to the first tube sheet 40 and the second tube sheet 42 such as by a structural and sealing joint 61. The first sleeves 50 generally create a structural support system that reacts to loads on the first and second tube sheets, 40 and 42, respectively, created by differential pressures within the pressure vessel 12.

The first and second tube sheets, 40 and 42, respectively, can be constructed or fabricated from a metallic material such as, for example, aluminum, carbon steel, stainless steel or a combination thereof. Similarly, the first sleeves 50 can be constructed or fabricated from a metallic material such as, for example, aluminum, carbon steel, stainless steel or a combination thereof.

The first tube sheet assembly 32 may further include structural support members (not shown) extending between the first tube sheet 40 and the second tube sheet 42 and disposed between, around or next to adjacent sleeves 50 to provide additional structural stability to the first tube sheet assembly 32. Such structural support members may be constructed, for example, from schedule 80 carbon steel pipe having a diameter of about 5 cm (about 2 inches).

The pressure vessel 12 may also include a second tube sheet assembly 44 disposed within the pressure vessel 12 adjacent the pressure vessel second end 18. The second tube sheet assembly 44 defines a second fluid reservoir 46 disposed between the second tube sheet assembly 44 and the pressure vessel second end 18 and a second permeate reservoir 48. The second fluid reservoir 46 is in fluid communication with residual stream outlet 26 and the second permeate reservoir 48 is in fluid communication with at least one second permeate stream outlet 30.

The second tube sheet assembly 44 may be constructed in a manner similar to the first tube sheet assembly 32, as shown in FIGS. 2 and 3. In particular, as illustrated in FIG. 2, the second tube sheet assembly 44 may include a second pair of tube sheets, which includes a third tube sheet 62 and a fourth tube sheet 64, which define the second permeate reservoir 48 therebetween. The second tube sheet assembly 44 further includes a plurality of second sleeves 66 disposed between the third tube sheet 62 and the fourth tube sheet 64. The third tube sheet 62 has a plurality of third openings formed therethrough and the fourth tube sheet 64 has a plurality of corresponding fourth openings formed therethrough.

Each second sleeve 66 has a first end disposed within and extending through one of the third openings in the third tube sheet 62 and a second end disposed within and extending through the corresponding fourth opening in the fourth tube sheet 64 forming a plurality of second channels 68 which extend through the second tube sheet assembly 44. As shown in FIG. 2, the plurality of first channels 60 generally correspond to the plurality of second channels 68.

Figure 5:
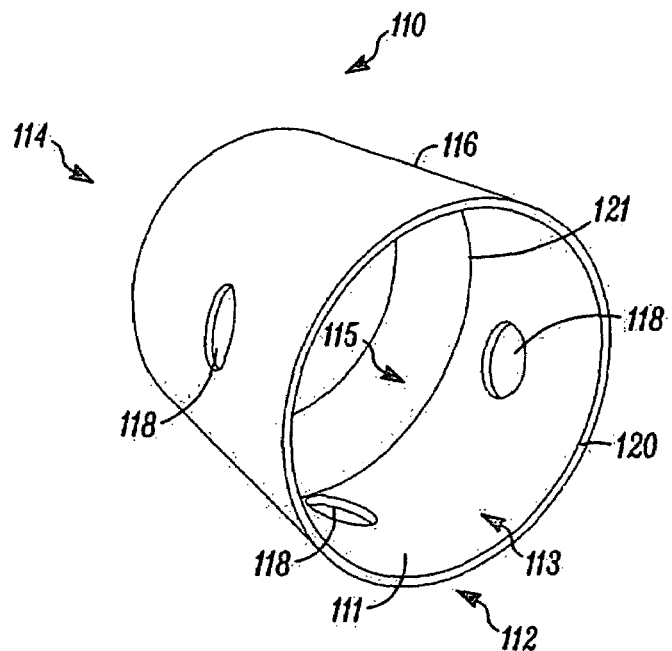
FIG. 5 is a perspective view of a sleeve for use in the tube sheet assembly shown in FIG. 3.

FIG. 5 illustrates, in greater detail, a sleeve 110, which advantageously permits or otherwise allows permeate material to be carried into an associated permeate reservoir. The sleeve 110 includes a first end 112, a second end 114 and a body portion 116 extending between the first end 112 and the second end 114. The body portion 116 is suitably in the form of a tube or otherwise hollow structure such as forms one of the first channels 60 which extends through the first tube sheet assembly 32 or one of the second channels 68 which extends through the second tube sheet assembly 44, as shown in FIG. 2.

The body portion 116 of the sleeve 110 includes at least one permeate exit opening 118 formed therethrough to permit permeate material to be carried into an associated permeate reservoir. For example, as illustrated in FIG. 5, the sleeve 110 may include three permeate exit openings 118 formed through the body portion 116. The sleeve 110 may include two, three, four or more permeate exit openings 118 to accommodate desired process specifications.

The body portion 116 of the sleeve 110 further includes a first sealing area 113 disposed between the first end 112 and the at least one permeate exit opening 118 and/or a second sealing area 115 disposed between the second end 114 and the at least one permeate exit opening 118 to restrain or maintain an associated permeate adapter within the sleeve.

The first sealing area 113 can include a retaining clip groove 120 formed or cut into an inner surface 111 of the sleeve which restrains or maintains an associated permeate adapter within the sleeve. The second sealing area 115 can also include a retaining clip groove 121 formed or cut into the inner surface 111 of the adapter sleeve which restrains or maintains an associated permeate adapter within the sleeve 110.

Alternatively or additionally, the body portion 116 of the sleeve 110 can include at least one hole, aperture or opening (not shown) formed or cut through the body portion 116 of the sleeve 110 generally associated with the first and/or second sealing areas, 113 and 115, respectively, for receiving a pin which restrains or maintains an associated permeate adapter within the sleeve 110.

Returning to FIG. 2, the separation system 10 further includes a plurality of membrane cartridge assemblies 70 disposed within the pressure vessel 12 and extending between the pressure vessel first end 16 and the pressure vessel second end 18. In accordance with certain embodiments, at least a portion of the membrane cartridge assemblies 70 are disposed within a cartridge chamber 72 disposed between the first tube sheet assembly 32 and the second tube sheet assembly 44.

The separation system 10, as shown in FIG. 2, is generally known or referred to as a single-pass system. In practice, a fluid is fed to the first fluid reservoir 34 via the feed stream inlet 24. The fluid passes into the membrane cartridge assemblies 70, wherein select components of the fluid permeate through membrane separation elements contained within the membrane cartridge assemblies 70 and are collected in the first permeate reservoir 36 and/or the second permeate reservoir 48 and are removed from the separation system via the at least one first permeate stream outlet 28 and/or the at least one second permeate stream outlet 30. Non-permeate or residual components of the fluid exit the membrane cartridge assemblies 70 and are collected in the second fluid reservoir 46. The non-permeate or residual fluid is removed from the separation system via the residual stream outlet 26.

Figure 6:
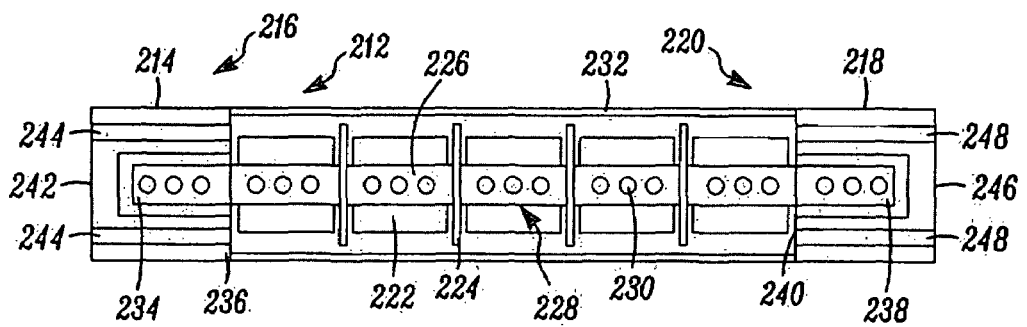
FIG. 6 is a cross-sectional view of a membrane cartridge assembly for use in the separation system shown in FIG. 1.

FIG. 6 illustrates, in greater detail, a membrane cartridge assembly 210. The membrane cartridge assembly 219 includes a membrane cartridge 212 which may contain one or more membrane separation elements 222. The membrane cartridge 212 illustrated in FIG. 6, for example, includes five membrane separation elements 222 which are joined sequentially or in series. The number of membrane separation elements 222 employed in particular membrane cartridge assemblies 210 is generally application dependent.

Individual membrane separation elements 222 may be interconnected by a clamp or other selected connection or coupling, such as designated by reference numeral 224. One suitable connection or coupling 224 for interconnecting individual membrane separation elements 222 is disclosed, for example, in commonly assigned U.S. Pat. No. 5,851,267.

Each membrane separation element 222 includes a central permeate tube 226 which, when the membrane separation elements 222 are interconnected, form, at least in part, a generally centrally disposed permeate passage tube 228 which extends through the membrane cartridge 212 from a first end 216 to a second end 220. The central permeate tubes 226 include a plurality of perforations 230 for receiving fluid which permeates through the membrane separation elements 222.

The membrane cartridge 212 may advantageously include a membrane pressure tube 232 which provides support for the membrane cartridge assemblies 210 and prevents the membrane cartridges 212 from sagging. Additionally, the membrane pressure tube 232 generally seals a feed side of the membrane separation elements 222 from a residual side of the membrane separation element 222.

The membrane pressure tube 232 may be in the form of a cylindrical tube which houses or contains the membrane separation elements 222. The membrane pressure tube 232 may be constructed from various metallic materials, such as, for example, aluminum, carbon steel, and/or stainless steel, or non-metallic materials such as, for example, carbon fiber reinforced polymer materials. The membrane pressure tube 232 may be constructed from light-weight materials and may withstand pressures of about 3.5 to about 7.0 kg/cm$^2$ (about 50 to about 100 psi).

The membrane cartridge assembly 210 includes a first permeate adapter 214 joined to the first end 216 of the membrane cartridge 212. The first permeate adapter may be further joined to a first end 234 of the permeate passage tube 228.

The membrane cartridge assembly 210 may further include a second permeate adapter 218 joined to a second end 220 of the membrane cartridge 212. The second permeate adapter 218 may be further joined to a second end 238 of the permeate passage tube 228.

The cartridge chamber 72, such as shown in FIG. 2, may include a plurality of racks or intermediate supports 73 to provide support for the membrane cartridge assemblies 70. Such racks prevent the portion of the membrane cartridge assemblies 70 disposed within the cartridge chamber 72, from sagging which alleviates or eliminates stress on the couplings between the membrane cartridge 70 and associated first and/or second permeate adapters.

As illustrated in FIG. 6, the membrane pressure tube 232 prevents the portion of the membrane cartridge assembly 210 within the cartridge chamber from sagging which alleviates or eliminates stress on the couplings between the membrane cartridge 212 and the first and/or second permeate adapters, 214 and 218, respectively. Racks or intermediate supports can be optionally removed.

The racks 73 may be positioned at intervals within the cartridge chamber 72 and may extend horizontally across a width of the cartridge chamber 72. For example, the racks may be constructed from tubing having square or round cross section or from angle bars that are disposed across the width of the cartridge chamber at about 1.2 to about 1.8 meter (about 4 to about 6 foot) intervals.

Alternatively, the racks may extend down a length of the cartridge chamber 72 (not shown). For example, the racks may be constructed from half tubes having a semi-circular or triangular cross-section that extend from a first end to a second end of the cartridge chamber, e.g., from the first tube sheet assembly 32 to the second tube sheet assembly 44, as shown in FIG. 2.

Figure 7:
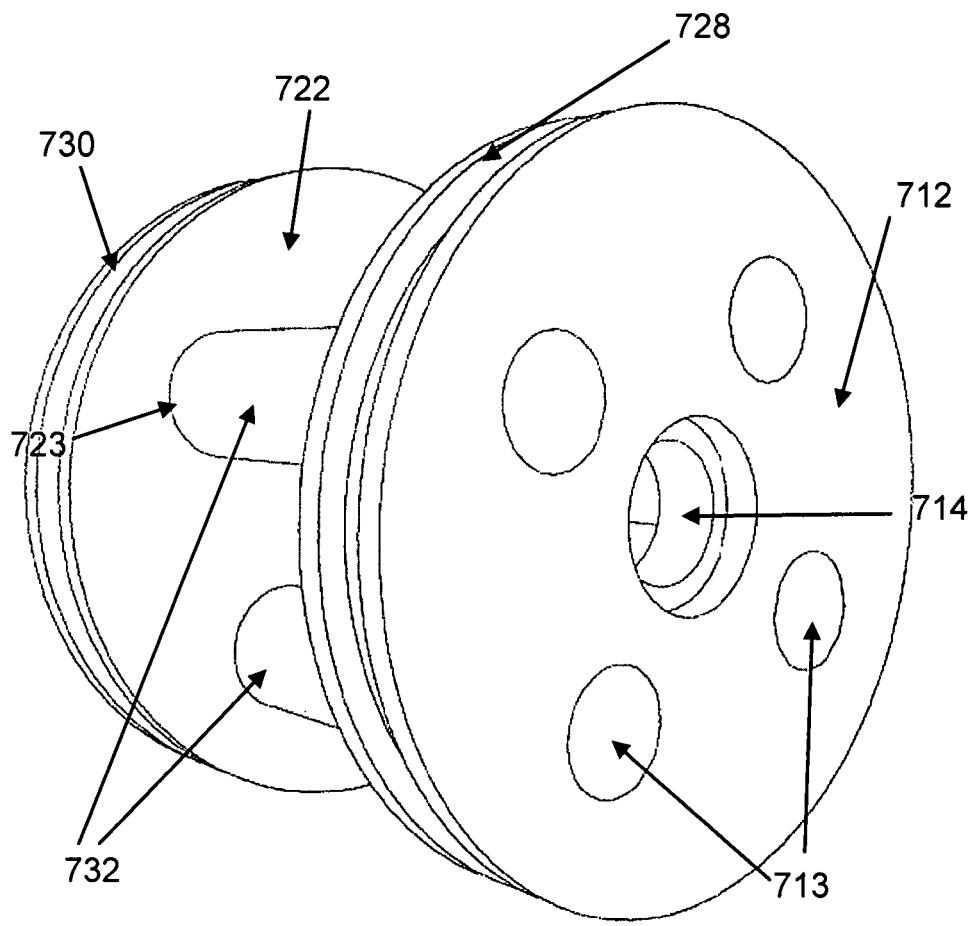
FIG. 7 is a front perspective view of a permeate adapter.

FIG. 7 illustrates a permeate adapter 710, such as the first and/or second permeate adapters 214 and 218 of FIG. 6. The permeate adapter 710 permits or otherwise allows permeate material to be carried out of a membrane cartridge, such as the membrane cartridge 212 as shown in FIG. 6, into an associated permeate reservoir, such as the permeate reservoir 36 as shown in FIG. 2.

Figure 8:
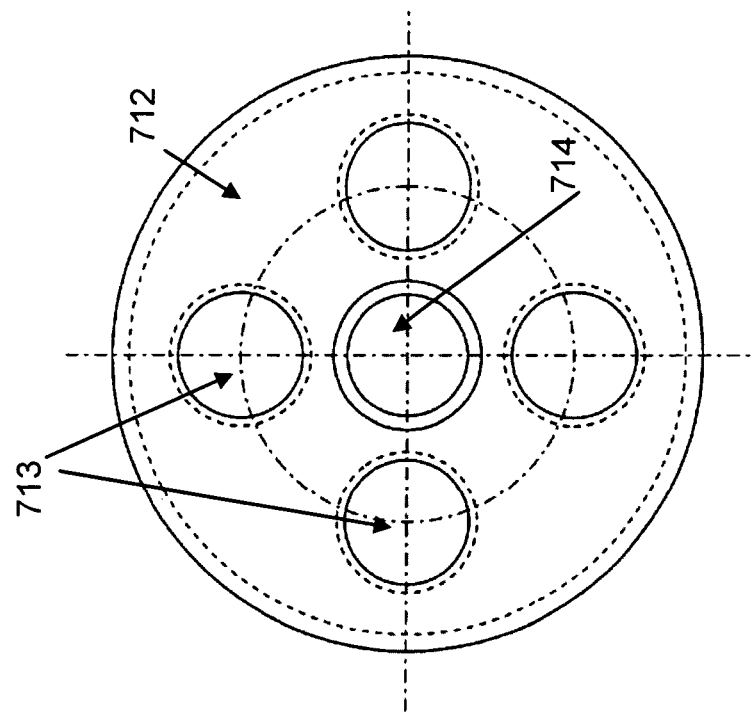
FIG. 8 is a cross-sectional view of the permeate adapter shown in FIG. 7.

With reference to FIG. 8, a front view of the permeate adapter 710 is shown. The permeate adapter 710 includes a front portion 712. The front portion 712 includes at least one fluid opening 713 and at least one permeate opening 714. The permeate opening 714 receives an end of a permeate passage tube, such as the first end 234 or the second end 238 of the permeate passage tube 228 as shown in FIG. 6. Further, the permeate opening 714 is in fluid communication with a permeate reservoir, such as the permeate reservoir 36 as shown in FIG. 2.

With reference again to FIG. 7, the permeate adapter 710 also includes a back portion 722, oppositely disposed from the front portion 712. The back portion 722 has at least one fluid opening 723.

At least one fluid passageway 732 is connected between the front portion fluid openings 713 and the back portions fluid openings 723. At the front portion 712, the at least one fluid passageway 732 receives an end of a membrane cartridge, such as the first end 216 or the second end 220 of the membrane cartridge 212 as shown in FIG. 6. Adjacent the back portion 722, the at least one fluid passageway 732 is in fluid communication with a fluid reservoir, such as the first fluid reservoir 34 or the second fluid reservoir 46 as shown in FIG. 2. The permeate adapter 710 may include one or more than one fluid passageways 732 depending upon the size of the permeate adapter 710 and/or the process in which the permeate adapter 710 is employed.

The front portion 712 and the back portion 722 of the permeate adapter 710 may be steel end-plates with the front portion being a front plate and the back portion being a back plate. The front and back portions 712 and 714 may alternately be formed of composite, man-made, or ceramic materials. The one or more fluid passageways 732 may be a steel, composite, man-made, or ceramic tube or pipe. The one or more fluid passageways 732 may be welded or otherwise joined to the front portion 712 and the back portion 722 with the one or more fluid passageways 732, the front portion 712 and the back portion 722 being discrete structural bodies.

The front portion 712 of the permeate adapter 710 includes a front notch 728 formed along the outer edge of the front portion 712. The front notch 728 contains a front o-ring inserted in the front notch 728 for providing isolation between the permeate adapter 710 and a membrane cartridge chamber, such as the cartridge chamber 72 of FIG. 2. The back portion 722 includes a back notch 730 formed along the outer edge of the back portion 722. A back o-ring is inserted in the back notch 730 to provide isolation between the permeate adapter 710 and a fluid reservoir, such as the fluid reservoir 34 or 46 of FIG. 2.

The permeate adapter 710 may be disposed within an associated sleeve, such as the sleeve 110 illustrated in FIG. 5. Once disposed within an associated sleeve, the front o-ring disposed in the front notch 728 forms a seal between the permeate adapter 710 and the associated sleeve whereby the space between the front portion 712 and back portion 722 is isolated from an associated cartridge chamber, such as the cartridge chamber 72 of FIG. 2. Additionally, the back o-ring disposed in the back notch 730 forms a seal between the permeate adapter 710 and the associated sleeve whereby the space between the front portion 712 and back portion 722 is isolated from an associated fluid reservoir, such as the fluid reservoir 34 as shown in FIG. 2.

Figure 9:
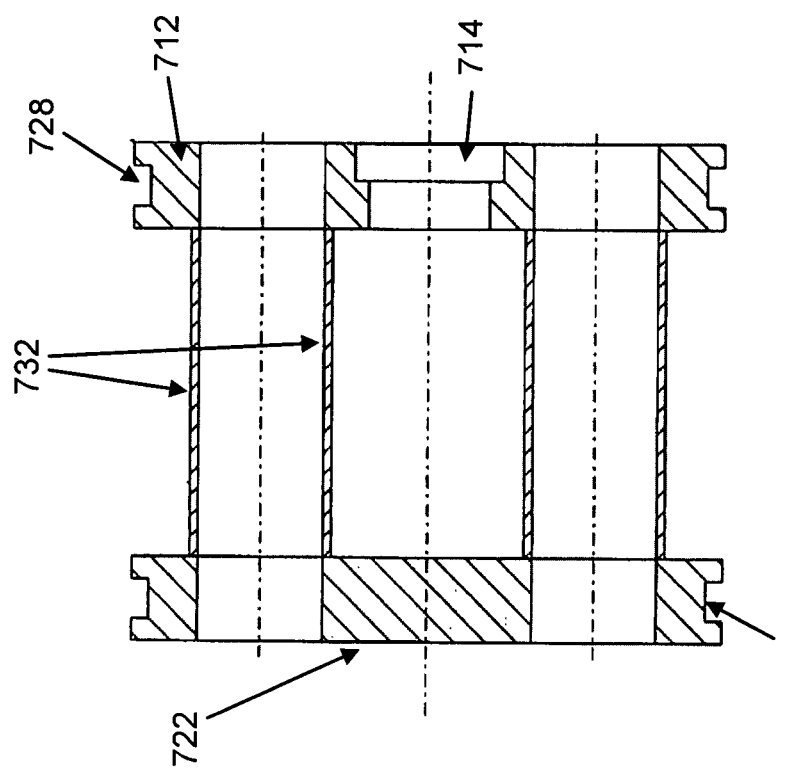
FIG. 9 is a side view of the permeate adapter shown in FIG. 7.

FIG. 9 is a side view of the permeate adapter 710. The front notch 728 formed in the front portion 712 and the back notch 730 formed in the back portion 722 may be seen in the side view. Also illustrated are four fluid passageways 732 and the permeate opening 714.

As the permeate opening 714 receives an end of a permeate passage tube, the fluid received from the permeate passage tube flows around the fluid passageways 732 in the space between the front portion 712 and the back portion 722 of the permeate adapter 710. Thus, once the permeate adapter 710 is disposed within an associate sleeve, the fluid, such as permeate material, exits through the permeate exit openings 118 of the associated sleeve 110 of FIG. 5.

In practice, the permeate adapter 710, once joined to a respective end of an associated permeate passage tube, places an associated membrane cartridge, such as membrane cartridge 212 of FIG. 6, in fluid communication with an associated permeate reservoir via the permeate opening 714 and the open space between the front portion 712 and the back portion 722. Further, the back portion 722 of the permeate adapter 710 is placed in fluid communication with an associated fluid reservoir, such as the fluid reservoir 34 of FIG. 2, through the back portion fluid openings 723. The front portion 712 of the permeate adapter 710 is placed in fluid communication with an end of the associated membrane cartridge, such as the first end 216 or the second end 220 of the membrane cartridge 212 of FIG. 6, through the front fluid openings 713.

In practice, referring to FIG. 6, a fluid to be separated is fed to a back portion 242 of the first permeate adapter 214. The fluid passes through first fluid passageways 244 into the first end 216 of membrane cartridge 212. Select components of the fluid permeate through the membrane separation elements 222 and are collected in the permeate passage tube 228. The permeated components are carried into the first and/or second permeate adapters, 214 and 218, via the permeate passage tube 228 where they are discharged from the first and/or second permeate adapters into an associate permeate reservoir via the space between the front portion 712 and the back portion 722 of the permeate adapter 710, such as shown in FIG. 7. Non-permeate or residual components in the fluid are carried out of the second end 220 of the membrane cartridge 212 into the second permeate adapter 218 where they exit a back portion 246 of the second permeate adapter 218 via second fluid passageways 248.

The permeate adapter 710 weighs less, costs less, and has fabrication benefits over permeate adapters formed from a solid piece of material, such as metal. The permeate adapter 710 is comprised of a front portion 712, a back portion 722, and one or more fluid passageways 732. The one or more fluid passageways 732 are welded or otherwise joined to the front and back portions 712 and 722.

In contrast, a permeate adapter formed from a solid piece of material may include a central blind bore formed within the permeate adapter, one or more permeate discharge ports, as well as one or more fluid ports. This solid piece of material with the bore and ports may weigh, for example, approximately 50% more than the permeate adapter 710. Additionally, the solid piece of material used to form a permeate adapter may cost more than the front portion 712, the back portion 722, and the one or more fluid passageways 732 used to form the permeate adapter 710. Furthermore, extra cost may be incurred in the fabrication of the permeate adapter from a solid piece of material as the fabrication process takes more time and is more complicated than the fabrication process of the permeate adapter 710.

Figure 10:
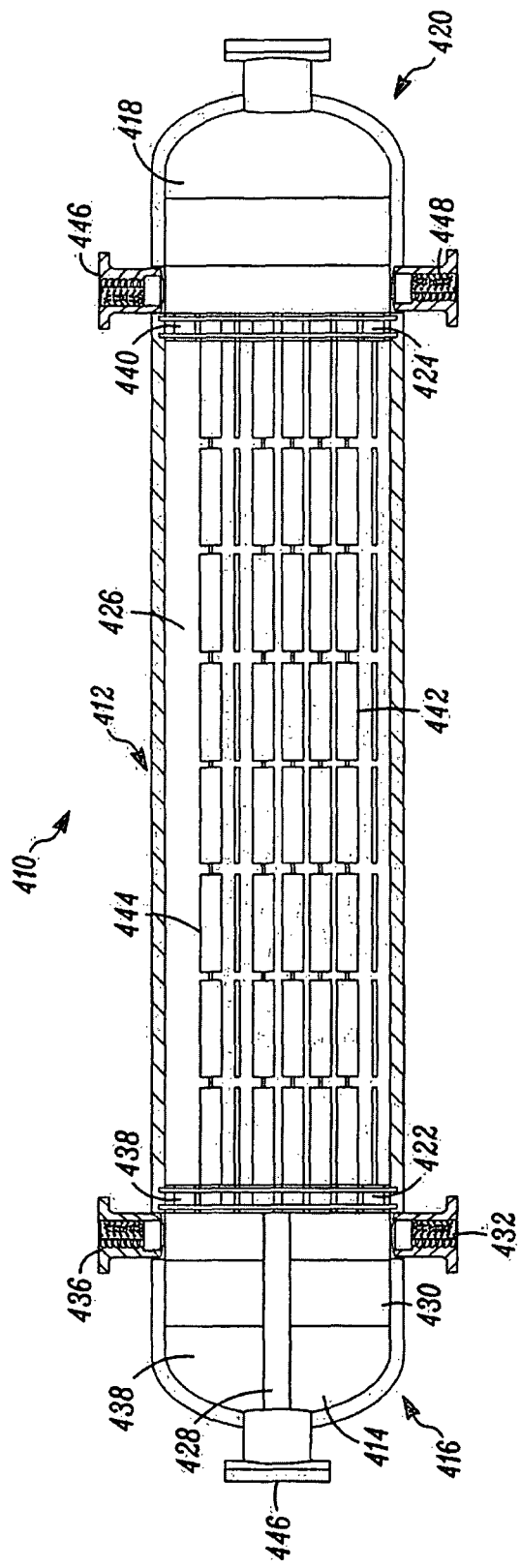
FIG. 10 is a cross-sectional side view of a separation system in accordance with another embodiment.

In an alternative embodiment, as shown in FIG. 10, a separation system 410 includes a pressure vessel 412 containing a first fluid reservoir 414 adjacent a first end 416 of the pressure vessel 412, a second fluid reservoir 418 adjacent a second end 420 of the pressure vessel 412, a first tube sheet assembly 422 adjacent the first fluid reservoir 414, a second tube sheet assembly 424 adjacent the second fluid reservoir 418, and a cartridge chamber 426 disposed between the first tube sheet assembly 422 and the second tube sheet assembly 424.

The first fluid reservoir 414 contains a divider plate 428 extending from the first end 416 of the pressure vessel 412 to the first tube sheet assembly 422. The divider plate 428 defines a feed chamber 430 in fluid communication with a feed stream inlet 432 and a residual chamber 434 in fluid communication with a residual stream outlet 436. The second fluid reservoir 418 may be in fluid communication with at least one fluid stream port 446.

The first and second tube sheet assemblies, 422 and 424, respectively, define a first permeate reservoir 438 and a second permeate reservoir 440, respectively. The first permeate reservoir 438 is in fluid communication with at least one first permeate stream outlet (not shown) and the second permeate reservoir 440 is in fluid communication with at least one second permeate stream outlet (not shown).

The cartridge chamber 426 includes at least one first membrane cartridge assembly 442 and at least one second membrane cartridge assembly 444. The at least one first membrane cartridge assembly 442 and the at least one second membrane cartridge assembly 444 may be constructed such as described herein and shown in FIG. 6. The at least one first membrane cartridge assembly 442 extends from the first tube sheet assembly 422 to the second tube sheet assembly 424 and is in fluid communication with the feed chamber 430, the first permeate reservoir 438, the second permeate reservoir 440, and the second fluid reservoir 418. The at least one second membrane cartridge assembly 444 extends from the first tube sheet assembly 422 to the second tube sheet assembly 424 and is in fluid communication with the residual chamber 434, the first permeate reservoir 438, the second permeate reservoir 440 and the second fluid reservoir 418.

In practice, a fluid is fed into the feed chamber 430 via feed stream inlet 432 and passes into the at least one first membrane cartridge assembly 442. Select components of the fluid permeate through membrane elements disposed within the at least one first membrane cartridge assembly 442 and are collected in the first permeate reservoir 438 and/or the second permeate reservoir 440. Non-permeate or residual components of the fluid exit the at least one first membrane cartridge assembly 442 and are collected in the second fluid reservoir 418, also known as a recycle reservoir. The non-permeate or residual fluid passes from the second fluid reservoir 418 into the at least one second membrane assembly 444. Select components of the residual fluid permeate through membrane elements disposed within the at least one second membrane cartridge assembly 444 and are collected in the first permeate reservoir 438 and/or the second permeate reservoir 440. The remaining fluid containing non-permeate components exits the at least one second membrane cartridge assembly 444 into the residual chamber 434 where it is removed from the pressure vessel 412 via residual stream outlet 436. A separation system 410 operated in this manner is generally known or referred to as a double-pass system.

The divider plate 428 may be mounted within the first fluid chamber 414 using a hinge or similar moveable attachment such that the divider plate 428 may be moved to allow access to the interior of the pressure vessel 412 such a via a manway 446 formed in the first end 416 of the pressure vessel 412. In accordance with another embodiment, the divider plate 428 may be releasably mounted within the first fluid reservoir 414 whereby the divider plate 428 may be removed from the first fluid reservoir 414 to allow access to the first tube sheet assembly 422 and/or to convert the separation system 410 from a double-pass system to a single-pass system as described herein above.

The separation system 410 can further include a divider plate such as, for example, similar to divider plate 428, disposed within the second fluid reservoir 418 extending from the second end 420 of the pressure vessel to the second tube sheet assembly 424. The divider plate 428 within the first fluid reservoir 414 can define first and second feed chambers (e.g., chambers 430 and 434, respectively) and the divider plate within the second fluid reservoir 418 can define opposing first and second residual reservoirs. The at least one first membrane cartridge assembly 442 extends from the first tube sheet assembly 422 to the second tube sheet assembly 424 and is in fluid communication with the first feed chamber (e.g., chamber 430), the first permeate reservoir 438, the second permeate reservoir 440, and the opposing first residual chamber. The at least one second membrane cartridge assembly 444 extends from the first tube sheet assembly 422 to the second tube sheet assembly 424 and is in fluid communication with the second feed chamber (e.g., chamber 434), the first permeate reservoir 438, the second permeate reservoir 440, and the opposing second residual chamber. The first residual chamber is in fluid communication with a first fluid stream port 448 and the second residual is in fluid communication with a second fluid port (e.g., fluid stream port 446). A separation system 410 operated in this manner is generally allows for or provides a 50% turndown (i.e., a 50% reduction in the volume of gas treated within the system) when fluid is fed to one of the first and second feed chambers (e.g., chambers 430 and 434).

The divider plate 428 can extend through the first tube sheet assembly 422 and define first and second permeate reservoirs therein. Additionally, or alternatively, a divider plate, similar to the divider plate 428, disposed within the second fluid reservoir 418 can extend through the second tube sheet assembly 424 and define first and second permeate reservoirs therein.

Two or more divider plates, such as, for example, similar to the divider plate 428, can be disposed within the first fluid reservoirs 414 to define three or more fluid chambers in the first end 416 of the pressure vessel 412. Additionally or alternatively, two or more divider plates, such as, for example, similar to the divider plate 428, can be disposed within the second fluid reservoirs 418 to define three or more fluid chambers in the second end 420 of the pressure vessel 412.

Optionally, separation systems such as shown in FIG. 2 or 10 may further include at least one condensation port (not shown) in fluid communication with an associated cartridge chamber, such as the cartridge chamber 72 shown in FIG. 2 or the cartridge chamber 426 show in FIG. 10.

Figure 11:
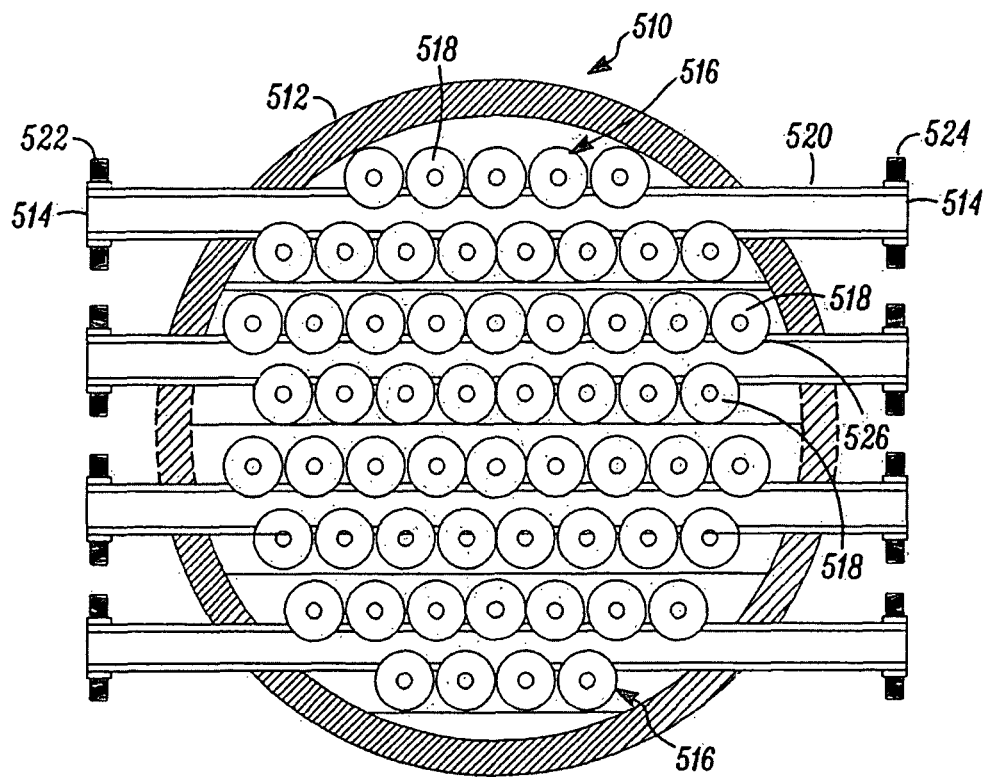
FIG. 11 is an end view of a separation system in accordance with a further embodiment.

As shown in FIG. 11, a separation system 510 includes an elongated pressure vessel 512 including a feed stream inlet (not shown), a residual stream outlet (not shown) and plurality of permeate stream outlets 514. The separation system 510 further includes a plurality of membrane cartridge assemblies 516 extending from a first end to a second end of the pressure vessel 512. The membrane cartridge assemblies 516, constructed such as, for example, shown in FIG. 6, include at least a first permeate adapter 518, constructed such as described herein and shown in FIGS. 7-9, joined to a membrane cartridge (not shown).

The separation system 510 additionally includes a plurality of permeate headers 520 extending through the pressure vessel 512 perpendicular to the plurality of membrane cartridge assemblies 516. Each permeate header 520 is in fluid communication with a first permeate stream outlet 522, a second permeate stream outlet 524, and at least one membrane cartridge assembly 516. Each of the plurality of permeate headers 520 may include a plurality of adapter notches 526 for receiving one or more corresponding membrane cartridge assemblies 516. In practice, a membrane adapter notch 526 receives a permeate adapter 518 joined to a corresponding membrane cartridge assembly 516.

The separation system 510 can further include a permeate reservoir (not shown) having at least one permeate stream outlet for collecting permeate from the plurality of permeate headers 520. Such permeate reservoir can be in the form of a ring which surrounds or encircles the separation system 510 such that the first and second permeate outlets, 522 and 524, respectively, of each permeate header 520 are in fluid communication with the permeate reservoir. In practice, individual permeate streams from the plurality of permeate headers 520 are combined within the permeate reservoir and such combined permeate stream can be drawn from the separation system 510 using a reduced number of permeate stream outlets.

Figure 12:
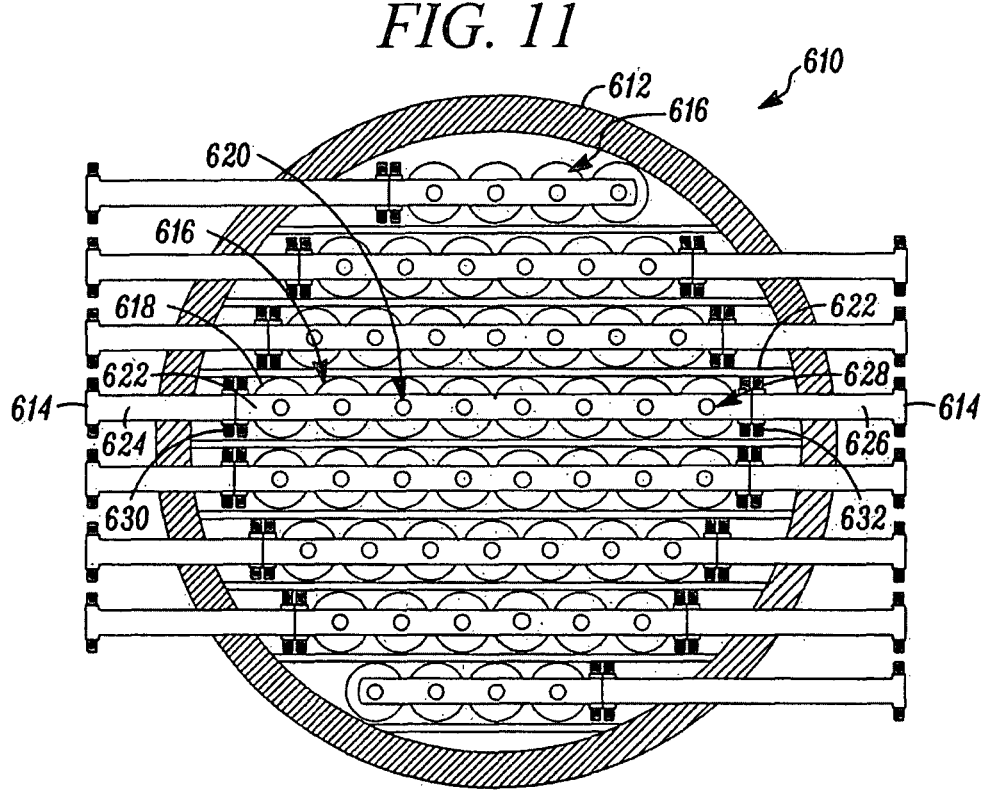
FIG. 12 is an end view of a separation system in accordance with yet another embodiment.

As shown in FIG. 12, a separation system 610 includes an elongated pressure vessel 612 including a feed stream inlet (not shown), a residual stream outlet (not shown) and plurality of permeate stream outlets 614. The separation system further includes a plurality of membrane cartridge assemblies 616 extending from a first end to a second end of the pressure vessel 612. The membrane cartridge assemblies 616 include at least a first permeate adapter 618, constructed such as described herein and shown in FIGS. 7-9, attached to a membrane cartridge (not shown).

The separation system 610 includes a plurality of permeate headers 620 extending through the pressure vessel 612 perpendicular to the plurality of membrane cartridge assemblies 616. Each permeate header 620 includes an internal header portion 622 disposed within the pressure vessel 612. The internal header portion 622 of each permeate header 620 is releasably attached to a first permeate stream outlet 624 and/or a second permeate stream outlet 626. A first end 628 of at least one membrane cartridge assembly 616 is releasably attached to an internal header portion 622 of an associated permeate header 620.

Each permeate header 620 further includes a first pair of raised face flanges 630 and/or a second pair of raised face flanges 632. The first pair of raised face flanges 630 releasably attach the internal header portion 622 of one of the permeate headers 620 to an associated first permeate stream outlet 624 and the second pair of raised face flanges 632 releasably attach the internal header portion 622 to a corresponding second permeate stream outlet 626.

The separation system 610 can further include a permeate reservoir similar to the permeate reservoir described above in conjunction with separation system 510.

As described above, a separation system which incorporates a plurality of membrane cartridge assemblies within a pressure vessel that allows permeate to be transmitted from the plurality of membrane cartridges into one or more common permeate reservoirs within the pressure vessel where the permeate may be removed from the separation system via at least one permeate stream exit port is provided. Thus, feed stream delivery, residual stream removal from, and permeate stream removal form a multitude of membrane cartridges at a reduced number of locations is provided.

As detailed herein, improvements and benefits realizable through the practice include, a separation system that produces or results in improved packaging at the skid level, reduced cost and installation weight due to the elimination of piping or flow connections to individual membrane cartridges or modules, and increased flexibility regarding flow configurations without requiring significant hardware substitutions.

The structures illustratively disclosed herein suitably may be practiced in the absence of any element, step, part, component, or ingredient which is not specifically disclosed herein.

While in the foregoing detailed description of this disclosure has been described in relation to certain representative structures thereof, and many details have been set forth for purposes of illustration, it will be apparent to those skilled in the art that the disclosure can be varied considerably without departing from the basic principles of the disclosure.

The invention claimed is:

1. A separation system comprising:
   an elongated pressure vessel having a feed stream inlet, a residual stream outlet and at least one permeate stream outlet;
   a first tube sheet assembly disposed within the pressure vessel, the first tube sheet assembly including a first pair of tube sheets and a plurality of first sleeves disposed therebetween, wherein the first pair of tube sheets define a first permeate reservoir therebetween, the first permeate reservoir in fluid communication with the at least one permeate stream outlet;
   a first fluid reservoir disposed within the pressure vessel between a first end of the pressure vessel and the first tube sheet assembly; and
   a plurality of membrane cartridge assemblies disposed within the pressure vessel and extending between the first end and a second end of the pressure vessel, at least one membrane cartridge assembly including a first permeate adapter and a membrane cartridge, the first permeate adapter joined to a first end of the membrane cartridge and disposed within one of the first sleeves,
   wherein the first permeate adapter comprises:
   a front plate having at least one fluid opening and a permeate opening which receives an end of a permeate passage tube of a membrane cartridge at the front plate and is in fluid communication with a permeate reservoir;
   a back plate longitudinally spaced from the front plate and having at least one fluid opening; and
   at least one tube extending from the front plate to the back plate to fluidly couple the front plate fluid opening and the back plate fluid opening which receives an end of a membrane cartridge at the front plate and is in fluid communication with a fluid reservoir adjacent the back plate, the front plate and back plate comprising discrete structural bodies joined together by the at least one tube.

2. The separation system of claim 1, further comprising a second tube sheet assembly disposed within the pressure vessel, the second tube sheet assembly including a second pair of tube sheets and a plurality of second sleeves disposed therebetween, the plurality of second sleeves corresponding to the plurality of first sleeves wherein the second pair of tube sheets define a second permeate reservoir therebetween.

3. The separation system of claim 2, further comprising a second fluid reservoir disposed within the pressure vessel between the second end of the pressure vessel and the second tube sheet assembly.

4. The separation system of claim 2, further comprising a cartridge chamber disposed within the pressure vessel between the first and second tube sheet assemblies.

5. The separation system of claim 3, wherein at least one membrane cartridge assembly further comprises a second permeate adapter joined to a second end of the membrane cartridge, the second permeate adapter disposed within the corresponding second sleeve and in fluid communication with the second permeate reservoir and the second fluid reservoir.

6. The separation system of claim 1, wherein the at least one membrane cartridge assembly further includes a permeate passage tube extending from the first end of the membrane cartridge to a second end of the membrane cartridge.

7. A pressure vessel comprising:
an elongated housing containing a first fluid reservoir adjacent a first end of the housing, a second fluid reservoir adjacent a second end of the housing, a first permeate reservoir adjacent the first fluid reservoir defined by a first tube sheet assembly, a second permeate reservoir adjacent the second fluid reservoir defined by a second tube sheet assembly, and a cartridge chamber disposed between the first and second permeate reservoirs, the first tube sheet assembly including a first tube sheet, a second tube sheet and a plurality of first sleeves disposed therebetween, the second tube sheet assembly including a third tube sheet, a fourth tube sheet and a plurality of second sleeves disposed therebetween, the plurality of second sleeves corresponding to the plurality of first sleeves;
a feed stream inlet, a residual stream outlet, at least one first permeate stream outlet in fluid communication with the first permeate reservoir, and at least one second permeate stream outlet in fluid communication with the second permeate reservoir;
a plurality of membrane cartridge assemblies disposed within the elongated housing and extending between the first fluid reservoir and the second fluid reservoir, each membrane cartridge assembly including a first permeate adapter, a membrane cartridge and a second permeate adapter, the first permeate adapter joined to a first end of the membrane cartridge and disposed within one of the first sleeves, the first permeate adapter in fluid communication with the first fluid reservoir, the first end of the membrane cartridge and the first permeate reservoir, the membrane cartridge disposed within a membrane pressure tube, the second permeate adapter joined to a second end of the membrane cartridge and disposed within the corresponding second sleeve, the second permeate adapter in fluid communication with the second fluid reservoir, the second end of the membrane cartridge and the second permeate reservoir, wherein the first permeate adapter and the second permeate adapter each comprise:

a front plate having at least one fluid opening and a permeate opening which receives an end of a permeate passage tube of a membrane cartridge at the front plate and is in fluid communication with the first and/or second permeate reservoir;

a back plate longitudinally spaced from the front plate and having at least one fluid opening; and at least one tube extending from the front plate to the back to fluidly couple the front plate fluid opening and the back plate fluid opening which receives an end of a membrane cartridge at the front plate and is in fluid communication with the first and/or second fluid reservoir adjacent the back plate, the front plate and back plate comprising discrete structural bodies joined together by the at least one tube.

8. The pressure vessel of the claim 7, wherein the feed stream inlet is disposed in fluid communication with the first fluid reservoir and the residual stream outlet is disposed in fluid communication the second fluid reservoir.

9. The pressure vessel of claim 7, further comprising a divider plate disposed within the first fluid reservoir and extending from the first end of the housing to the first tube sheet assembly, the divider plate defining a feed chamber and a residual chamber.

10. The pressure vessel of claim 9, wherein the feed stream inlet and the residual stream outlet are adjacent the first end of the housing.

11. The pressure vessel of claim 9, wherein the second fluid reservoir is a recycle feed chamber.

* * * * *